US012238001B1

(12) United States Patent
Schroder et al.

(10) Patent No.: US 12,238,001 B1
(45) Date of Patent: Feb. 25, 2025

(54) NETWORK DEVICE CONFIGURED TO PROCESS PACKETS WITH TRAILERS

(71) Applicant: Marvell Israel (M.I.S.L) Ltd., Yokneam (IL)

(72) Inventors: Jacob Jul Schroder, Kongens Lyngby (DK); Itay Shlomo Peled, Hagor (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 469 days.

(21) Appl. No.: 17/744,493

(22) Filed: May 13, 2022

Related U.S. Application Data

(60) Provisional application No. 63/188,376, filed on May 13, 2021.

(51) Int. Cl.
*H04L 12/66* (2006.01)
*H04L 45/74* (2022.01)
*H04L 47/32* (2022.01)

(52) U.S. Cl.
CPC .............. *H04L 45/74* (2013.01); *H04L 47/32* (2013.01)

(58) Field of Classification Search
CPC ... H04L 63/0485; H04L 63/164; H04L 49/90; H04L 45/24; H04L 2209/20; H04L 43/106; H04L 47/2483; H04L 47/34
See application file for complete search history.

(56) References Cited

U.S. PATENT DOCUMENTS

| 8,428,061 | B1 * | 4/2013 | Kopelman | .......... H04L 12/462 370/392 |
| 8,913,617 | B1 | 12/2014 | Kopelman | |
| 10,200,313 | B2 | 2/2019 | Zemach et al. | |
| 2011/0064081 | A1 * | 3/2011 | Lee | ..................... H04L 45/00 370/392 |

* cited by examiner

*Primary Examiner* — Kharye Pope

(57) ABSTRACT

A network device comprises a receive processor configured to generate respective packet descriptors that include i) respective header information extracted from headers of packets received via a plurality of network interfaces, the packets also including trailers, and ii) respective trailer information extracted from the trailers of the packets. A packet processor is configured to process the header information and the trailer information in the packet descriptors to determine actions to be performed on the packets, including determining network interfaces via which at least some packets are to be transmitted by the network device. A transmit processor is configured to transmit the at least some packets via the plurality of network interfaces in accordance with the determining of network interfaces by the packet processor.

18 Claims, 4 Drawing Sheets

NETWORK DEVICE CONFIGURED TO PROCESS PACKETS WITH TRAILERS

CROSS REFERENCES TO RELATED APPLICATIONS

This application claims the benefit of U.S. Provisional Patent Application No. 63/188,376, entitled "Enabling Trailer Processing in Header Based Packet Processor," filed on May 13, 2021, the disclosure of which is expressly incorporated herein by reference in its entirety for all purposes.

FIELD OF TECHNOLOGY

The present disclosure relates generally to network devices in communication networks, and more particularly to processing of packets with trailers in network devices.

BACKGROUND

Network devices, such as bridges, routers, etc., forward packets through a network based on addresses, and/or other information, in the packets. A network device typically includes a plurality of ports coupled to different network links. The network device may receive a packet via one port and process address information (and/or other information) in a header of the packet to decide via which other port or ports the network switch should transmit the packet. The network device then forwards the packet to the determined one or more other ports.

Upon receiving a packet, some network devices store the packet in a packet memory (sometimes referred to as a "packet buffer"). Some network devices also generate a packet descriptor that includes information about the packet, such as information from a header of the packet and a location of the packet in the packet memory.

The packet descriptor is processed at least to determine the port or ports of the network device to which to forward the packet, and the packet descriptor is then enqueued in one or more transmit queues corresponding to the determined port or ports. When the packet descriptor reaches a head of a transmit queue, the corresponding packet is retrieved from the packet memory for forwarding to the determined port or ports.

Some communication protocols define a packet structure in which protocol information is included in a packet trailer included at or near an end of the packet. For example, the Parallel Redundancy Protocol (PRP) standardized by International Electrotechnical Commission (IEC) 62439-3 defines an Ethernet packet structure in which PRP protocol information is included in a six byte packet trailer located between a packet body and an Ethernet cyclic redundancy check (CRC) field at an end of the packet. PRP provides for redundant network communications, which is useful in industrial networks for example. In PRP, a first device sends multiple copies of a packet via different network paths to a second device. Thus, if a fault occurs in one of the network paths, the packet will still be received at an intended endpoint.

The trailer includes a sequence number, a frame size, a path identifier, an Ethertype. An endpoint device analyzes a source address in a header of a received packet and the sequence number in the trailer to identify duplicate packets. When the endpoint device receives multiple copies of the same packet, the endpoint device accepts a first received copy of the packet and discards any later-received copies of the packet.

SUMMARY

In an embodiment, a network device comprises: a receive processor configured to couple to a plurality of network interfaces, the receive processor further configured to generate respective packet descriptors that include i) respective header information extracted from headers of packets received via the plurality of network interfaces, the packets also including trailers, and ii) respective trailer information extracted from the trailers of the packets; a packet processor configured to process the header information and the trailer information in the packet descriptors to determine actions to be performed on the packets, including determining network interfaces, among the plurality of network interfaces, via which at least some packets are to be transmitted by the network device; and a transmit processor configured to couple to the plurality of network interfaces, the transmit processor further configured to transmit the at least some packets via the plurality of network interfaces in accordance with the determining of network interfaces by the packet processor.

In another embodiment, a method for processing packets with trailers includes: receiving a packet via a first network interface of a network device, the packet including a header and a trailer, the first network interface among a plurality of network interfaces of the network device; generating, at the network device, a packet descriptor that includes i) header information extracted from the header of the packet, and ii) trailer information extracted from the trailer of the packet; processing, at a packet processor of the network device, the packet descriptor, including processing the header information and the trailer information in the packet descriptor, to determine one or more processing actions to be performed on the packets, including determining one or more second network interfaces, among the plurality of network interfaces, via which at least some packets are to be transmitted by the network device; and in response to the packet processor determining, based on processing the packet descriptor, that the packet is to be transmitted via the one or more second network interfaces of the network device, transmitting the packet via the one or more second network interfaces.

In yet another embodiment, a network device comprises: a packet memory configured to store packets received via a plurality of network interfaces; a receive processor configured to couple to the plurality of network interfaces, the receive processor further configured to i) generate respective packet descriptors that include respective header information extracted from headers of packets received via the plurality of network interfaces, and ii) store the packets in the packet memory; a packet processor configured to process the packet descriptors to determine actions to be performed on the packets, including, in response to determining that respective trailers should be added to a set of packets received via the plurality of network interfaces, i) generate the trailers, and ii) store each trailer that is to be added at a respective first location in the packet memory that is proximate to a respective second location in the packet memory of the respective header of the respective packet; and a transmit processor configured to couple to the plurality of network interfaces, the transmit processor further configured to transmit at least some packets via the plurality of network interfaces, including: in connection with transmitting each packet for which a trailer is to be added, retrieve the respective trailer from the respective first location in the packet memory in connection with transmitting the respective trailer.

In still another embodiment, a method for adding trailers to packets includes: receiving a packet via a first network interface of a network device, the packet including a header; storing the packet in a packet memory of the network device; determining, at the network device, that a trailer is to be added to the packet; in response to determining that the trailer is to be added to the packet, generating, at the network device, the trailer; storing the trailer in the packet memory at a first location that is proximate to a second location of the header of the packet; and transmitting, by the network device, the packet via a second network interface of the network device, including retrieving the trailer from the first location in the packet memory in connection with transmitting the trailer of the packet.

DETAILED DESCRIPTION

A packet processor of a typical network device, such as a switch, router, etc., is designed to analyze and modify headers of packets, and is incapable of analyzing, adding, or removing trailers of packets. In order to handle the analyzing, adding, or removing of trailers of packets, such packets are sent to a central processing unit (CPU) of the network device for processing, in typical network devices.

In embodiments described below, a packet processor of a network device is configured to analyze, add, modify, and/or remove trailers of packets. In some embodiments, the packet processor is configured to i) generate a packet descriptor that includes a) header information extracted from a header of a packet and b) trailer information extracted from a trailer of the packet, and ii) process the packet descriptor, including processing the trailer information in the packet descriptor.

In some embodiments, the packet processor is configured to store a packet, which does not include a trailer when received by the network device, in a memory, generate a trailer that is to be added to the packet, and store the trailer in the memory at a location proximate to a location of the header of the packet in the memory (i.e., not at an end of the packet). In such embodiments, in connection with transmitting the trailer of the packet, the trailer is read from the location in the memory that is proximate to the location of the header of the packet.

Figure 1:
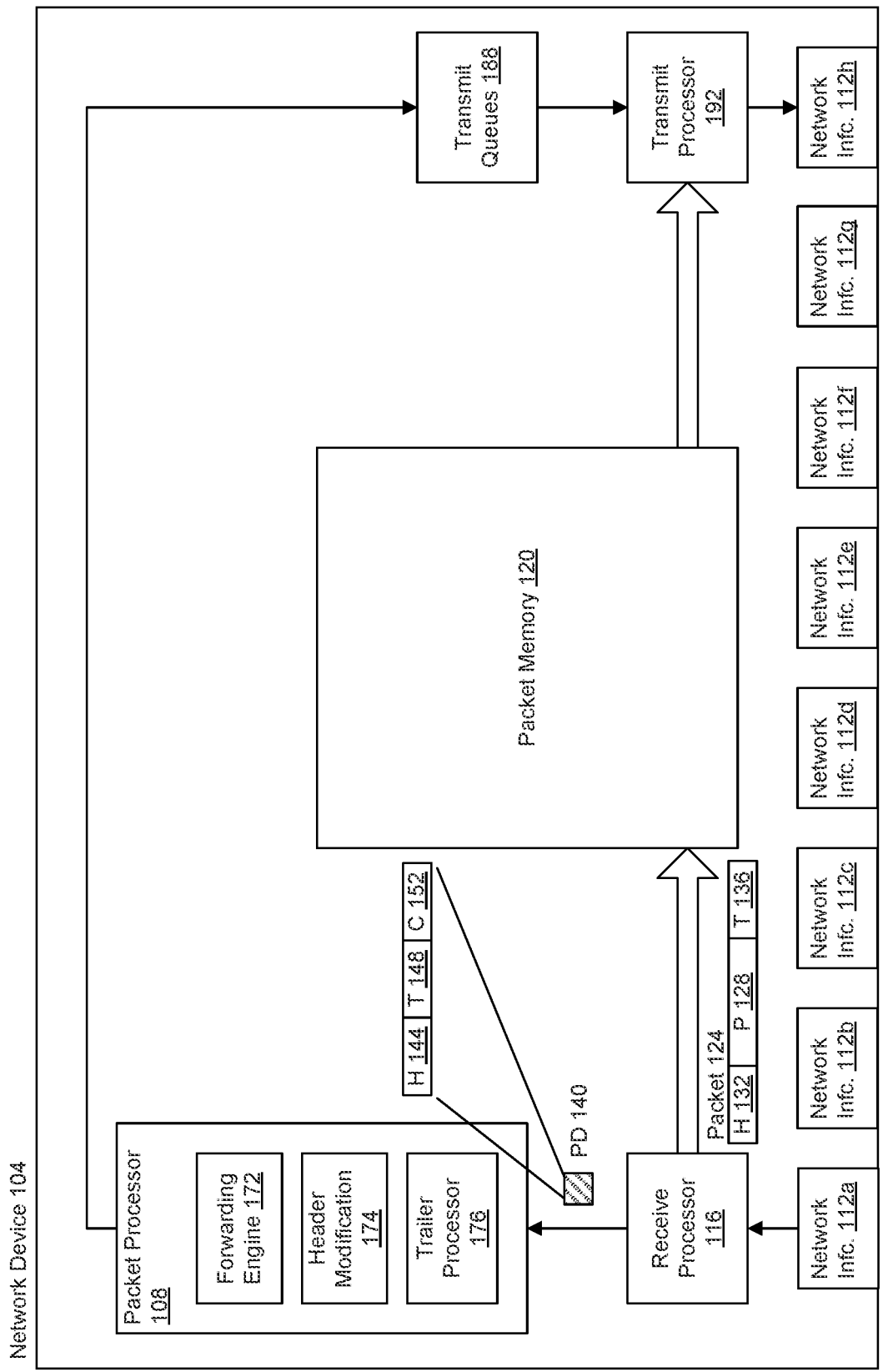
FIG. 1 is a simplified block diagram of an example network device that is configured to process packets with trailers, according to an embodiment.

FIG. 1 is a block diagram of an example network device 104 that includes a packet processor 108 that is configured to process trailers of packets, according to an embodiment. The network device 104 includes a plurality of network interfaces (e.g., ports) 112 configured to couple to respective network links. The network device 104 also includes one or more receive processors 116 coupled to the network interfaces 112. Although only one receive processor 116 is shown in FIG. 1, and the one receive processor 116 is shown as being coupled to only one network interface 112, the network device 104 includes multiple receive processors 116 and each of the multiple processors 116 is coupled to a respective set of one or more network interface 112, in some embodiments. The multiple receive processors 116 may be considered collectively as a single receive processor.

The receive processor 116 is configured to store packet data (e.g., at least payloads) corresponding to received packets in a packet memory 120. In FIG. 1, the receive processor 116 is illustrated storing an entire packet 124 in the packet memory 120. However, the receive processor 116 stores, for each of multiple packets, only an end portion of the packet 124 (e.g., including a payload 128 and a trailer 136) in the packet memory 120 at least initially, according to another embodiment. At least a portion of a header 132 of the packet 124 is later stored in the packet memory 120 by the network device 104, according to an embodiment. The receive processor 116 stores, for each of multiple packets, the payload 128 and the trailer 136, and at least a portion of the header 132 in the packet memory 120 at least initially, according to another embodiment. A remaining portion of the header 132 are later stored in the packet memory 120 by the network device 104, according to an embodiment. The receive processor 116 stores, for each of multiple packets, the entire packet 124 in the packet memory 120, according to yet another embodiment.

In an embodiment, the receive processor 116 includes direct memory access (DMA) circuitry (not shown) configured to store received packets (or at least portions of the packets) in the packet memory 120 via one or more read/write interfaces of the packet memory 120.

The receive processor 116 generates, for each of multiple packets, a packet descriptor 140 associated with the packet 124, according to an embodiment. Each packet descriptor 140 includes information regarding the corresponding packet, such as header information 144 from the header 132 of the packet 124, trailer information 148 from the trailer 136 of the packet 124, and optionally control information 152 associated with the packet 124, such as location information regarding a location of the corresponding packet in the packet memory 120, according to an embodiment. Each packet descriptor 140 has a data length that is much shorter than a length of a typical packet, according to some embodiments.

In an embodiment, the receive processor 116 is configured to i) extract header information 144 from the packet 124 and store the extracted header information 144 in the packet descriptor 140, and ii) extract trailer information 136 from the packet 124 and store the extracted trailer information 136 in the packet descriptor 140. In some embodiments, the receive processor 116 is configured to extract the entire trailer 136 from the packet 124 and store the extracted trailer 136 in the packet descriptor 140. In other embodiments, the receive processor 116 is configured to extract only a portion of the trailer 136 from the packet 124 and store the portion of the trailer 136 in the packet descriptor 140.

In some embodiments, the receive processor 116 is configured to i) extract a fixed length of packet data 144 from a beginning portion of the packet 124 and store the extracted information 144 in the packet descriptor 140, and ii) extract a fixed length of packet data 136 from an ending portion of the packet 124 and store the extracted information 136 in the packet descriptor 140. For example, the receive processor 116 is configured to i) extract a first 128 bytes (or another suitable length) of packet data 144 from the beginning portion of the packet 124 and store the extracted information 144 in the packet descriptor 140, and ii) extract a last 6 bytes (or another suitable length) of packet data 136 from an ending portion of the packet 124 and store the extracted information 136 in the packet descriptor 140, according to an illustrative embodiment.

The receive processor 116 provides the packet descriptors 140 to the packet processor 108, which is configured to process packets (e.g., by analyzing packet descriptors 140 corresponding to the packets), in an embodiment. In other embodiments, the receive processor 116 (or the packet processor 108) stores packet descriptors 140 in a packet descriptor memory (not shown) separate from the packet memory 120, and the packet processor 108 processes the packet descriptors stored in the packet descriptor memory. In such embodiments, a smaller packet descriptor includes an indicator of a location of the packet descriptor 140 in the packet descriptor memory, and the smaller packet descriptor is passed between components of the packet processor 108, and the indicator (within the smaller packet descriptor) of the location of the packet descriptor 140 in the packet descriptor memory is used by components of the packet processor 108 to access the packet descriptor 140. In some embodiments, the smaller packet descriptor optionally includes control information associated with the packet 124, such as location information regarding a location of the corresponding packet in the packet memory 120.

The packet processor 108 includes a forwarding engine 172. The forwarding engine 172 is configured to analyze at least header information 144 in packet descriptors 140 to determine network interfaces 112 via which packets (corresponding to the packet descriptors 140) are to be transmitted (referred to herein as "target network interfaces"). As merely an illustrative example, the forwarding engine 172 is configured to use at least a destination address in a header of a packet to perform a lookup in a forwarding database (not shown), which stores correspondences between destination addresses and network interfaces 112, to determine a target network interface 112 for the packet. As another illustrative example, the forwarding engine 172 is configured to use at least a VLAN ID in a header of a packet to perform a lookup in a forwarding database (not shown) (e.g., the same forwarding database discussed above or a different forwarding database), which stores correspondences between VLAN IDs and network interfaces 112, to determine a particular set of one or more target network interfaces 112 for the packet. The forwarding engine 172 is configured to store an ID of a target network interface (or set of multiple target network interfaces) in the packet descriptor corresponding to the packet, according to an embodiment.

The packet processor 108 also includes a header modification engine 174 that is configured to selectively modify header information corresponding to the packet 124. For example, header modification engine 174 that is configured to selectively modify a next hop address in a header of the packet 124, remove a tunneling header from the packet 124, add a tunneling header to the packet 124, etc., in accordance with processing of the packet descriptor performed by the header modification engine 174 and/or one or more other processing elements of the packet processor 108. In one embodiment, the header modification engine 174 selectively modifies the header information 144 in the packet descriptor 140. As will be described in more detail below, when the packet 124 is to be transmitted, the network device 104 transmits the modified header information 144 rather than the header 132, in some embodiments.

In other embodiments in which the header 132 is stored in the packet memory 120, the header modification engine 174 is configured to selectively modify the header 132 stored in the packet memory 120.

The packet processor 108 also includes a trailer processor 176 that is configured to analyze at least trailer information 148 in a packet descriptor 140 to determine how the trailer 136 is to be processed. As merely an illustrative example, the trailer processor 176 is configured to use at least i) a source address in the header information 144 and ii) a sequence number in the trailer information 148 to determine if the packet 124 associated with the packet descriptor 140 is to be dropped. For example, the trailer processor 176 determines whether a previous packet having the same source address and the same sequence number was previously received within a suitable time period; in response to determining that a previous packet having the same source address and the same sequence number was previously received within the time period, the trailer processor 176 determines that the packet associated the packet descriptor 140 is to be dropped by the network device 104. In response to the trailer processor 176 determining that the packet associated the packet descriptor 140 is to be dropped, the packet processor 108 drops the packet. For example, the packet processor 108 discards the packet descriptor 140 and designates memory resources in the packet memory 120 corresponding to the packet as available for storage.

In an embodiment, for packets that the trailer processor 176 determines are not to be dropped, the trailer processor 176 further determines whether the trailer 136 is to be removed from the packet 124 so that the packet 124 is transmitted by the network device 104 without the trailer 136, at least in some scenarios. For the PRP, removing a PRP trailer may be useful, for example, if the network device 104 is connected to an endpoint device that is not capable of processing PRP trailers but for which it is desired to use PRP to achieve redundant communications. In some embodiments, the trailer processor 176 maintains a database (not shown) that indicates one or more endpoint devices for which trailers are to be removed from packets that the network device 104 is to forward to the one or more endpoint devices. In some such embodiments, the trailer processor 176 is configured to use at least a destination address in the header information 144 to search the database to determine if the trailer 136 is to be removed from the packet 124.

In response to the trailer processor 176 determining that the trailer 136 is to be removed from the packet 124, the trailer processor 176 stores an indication in the packet descriptor 140 that the trailer 136 is to be removed from the packet 124. As will be discussed below, another processing unit in the network device 104 causes, in response to the indication in the packet descriptor, the packet 124 to be transmitted from the network device 104 without the trailer 136.

In some embodiments, the trailer processor 176 is configured to determine whether the trailer 136 is to be modified. In embodiments in which the trailer processor 176 is configured to determine whether the trailer 136 is to be modified, and when the trailer processor 176 determines that the trailer 136 is to be modified, the trailer processor 176 modifies the trailer information 148 within the packet descriptor 140. In some embodiments, when the trailer processor 176 modifies the trailer information 148, the trailer processor 176 modifies the packet descriptor 140 to indicate that the trailer information 148 has been modified. As will be described in more detail below, when the packet 124 is to be transmitted, the network device 104 transmits the modified trailer information 148 rather than the original trailer 136 stored in the packet memory 120, in some embodiments.

After the packet descriptor 140 has been processed by the header modification engine 174 and the trailer processor 176, the packet processor 108 stores the header information 144 and the trailer information 148 in the packet memory 120 (or another memory (not shown) separate from the packet memory 120, according to some embodiments. In such embodiments, the header information 144 and the trailer information 148 are stored together in the packet memory 120 (or the other memory (not shown)), i.e., the trailer information 148 is stored at a location that is proximate to a location of the header information 144. In some embodiments, the header information 144 and the trailer information 148 are stored together in the packet memory 120 at a different location than the location at which a remaining portion of the packet 124 (e.g., at least the payload 128 and the trailer 136) is stored.

In some embodiments, the packet processor 108 modifies the packet descriptor to 140 to include one or more indications of the locations in the packet memory 120 (or the other memory (not shown)) at which the header information 144 and the trailer information 148 are stored. In an embodiment in which the trailer information 148 has a fixed length (e.g., 6 bytes or another suitable length) and the trailer information 148 is stored in the packet memory 120 (or the other memory (not shown)) before and next to the header information 144, the location of the header information 144 can be determined using the location of the trailer information 148 and the fixed length of the trailer information 148. In an embodiment in which the header information 144 has a fixed length (e.g., 128 bytes or another suitable length) and the trailer information 148 is stored in the packet memory 120 (or the other memory (not shown)) after and next to the header information 144, the location of the trailer information 148 can be determined using the location of the header information 144 and the fixed length of the header information 144.

In some embodiments in which the packet processor 108 stores the header information 144 and the trailer information 148 in the packet memory 120 (or the other memory (not shown)) after the packet descriptor 140 has been processed by the header modification engine 174 and the trailer processor 176, the packet processor 108 shortens the packet descriptor 140 by removing the header information 144 and the trailer information 148, or creates a new packet descriptor 140 that omits the header information 144 and the trailer information 148.

The network device 104 further comprises a respective set of one or more transmit queues 188 for each of multiple network interfaces 112. For example, different transmit queues, all corresponding to a single network interface 112, each correspond to a different priority, in an embodiment.

The packet processor 108 stores the packet descriptors 140 into appropriate transmit queues 188 corresponding to appropriate target network interfaces 112.

For example, the packet processor 108 analyzes information in the packet descriptors (e.g., target network interface IDs, priority information, etc.) to determine appropriate transmit queues 188 into which the packet descriptors 140 are to be stored. As an illustrative example, respective pluralities of transmit queues 188 correspond to respective ports, where each transmit queue 188 corresponding to a single port also corresponds to a respective priority level, according to an embodiment. At least some of the transmit queues 188 are arranged as first-in-first-out (FIFO) linked lists, according to an embodiment.

When a packet descriptor reaches the head of a transmit queue 188, the packet descriptor is provided to a transmit processor 192 that corresponds to the target network interface 112 of the packet corresponding to the packet descriptor. Although only one transmit processor 192 is shown in FIG. 1, and the one transmit processor 192 is shown as being coupled to only one network interface 112, the network device 104 includes multiple transmit processors 192 and each of the multiple transmit processors 192 is coupled to a respective set of one or network interfaces 112, in some embodiments. The multiple transmit processors 192 may be considered collectively as a single transmit processor.

The transmit processor 192 retrieves packet data corresponding to the packet descriptor from the packet memory 120 via the one or more read/write interfaces of the packet memory 120. In an embodiment, the transmit processor 192 includes DMA circuitry configured to retrieve packets (or at least payloads of the packets) in the packet memory 120 via the one or more read/write interfaces of the packet memory 120. In embodiments in which the header information 144 and the trailer information 148 are stored in the other memory (not shown) separate from the packet memory 120, the transmit processor 192 retrieves the header information 144 and, optionally, the trailer information 148 from the other memory via the one or more read/write interfaces of the other memory. In an embodiment, the packet descriptor 140 includes first location information indicating a location of the header information 144 in the packet memory 120 (or the other memory), and the transmit processor 192 uses the first location information to retrieve the header information 144 from the packet memory 120 (or the other memory (not shown). The transmit processor 192 then provides the header information 144 to the network interface 112 for transmission.

In an embodiment, the packet descriptor 140 includes second location information indicating a location of other packet data in the packet memory 120 (e.g., including at least the payload 128), and the transmit processor 192 uses the second location information to retrieve the other packet data corresponding to the packet descriptor 140 from the packet memory 120. The transmit processor 192 then provides the other packet data to the network interface 112 for transmission.

In an embodiment, if the packet descriptor 140 includes an indication that the trailer 136 is to be removed from the packet 124, the transmit processor 192, in response to the indication, does not retrieve the trailer 136 from the packet memory 120, and does not retrieve the trailer information 148 from the packet memory 120 (or the other memory (not shown)), and provides the packet data, which omits the trailer 136 and omits the trailer information 148, to the network interface 112, i.e., the packet data, after having been provided to the network interface 112, does not include the trailer 136 nor the trailer information 148. Accordingly, the network interface 112 transmits the packet such that the packet, after having been transmitted by the network interface 112, does not include the trailer 136.

In an embodiment, if the packet descriptor 140 includes an indication that the trailer information 148 was modified and does not include an indication that the trailer is to be removed, the transmit processor 192, in response to the indications, does not retrieve the trailer 136 from the packet memory 120, but rather retrieves the trailer information 148 from the packet memory 120 (or the other memory (not shown)), and provides the packet data, which includes the trailer information 148, to the network interface 112, i.e., the packet data, after having been provided to the network interface 112, includes the trailer information 148. Accordingly, the network interface 112 transmits the packet such that the packet, after having been transmitted by the network interface 112, includes the trailer information 148.

In some embodiments, the transmit processor 192 is configured to determine whether the original trailer information 136 or the trailer information 148 is to be retrieved in connection with transmitting a trailer of the packet 124. In some embodiments, the transmit processor 192 is configured to make the determination based on whether the packet descriptor 140 indicates that the trailer information 148 was modified by the packet processor 108. In other embodiments, when the trailer is to be transmitted, the transmit processor 192 is configured retrieve the trailer information 148 in connection with transmitting a trailer of the packet 124 regardless of whether the packet descriptor 140 indicates that the trailer information 148 was modified by the packet processor 108.

In an embodiment, the network device 104 further includes one or more central processing units (CPUs) (not shown).

The receive processor 116 is implemented using i) one or more processors executing machine readable instructions stored in one or more memories, ii) hardware circuitry (e.g., one or more hardware state machines, a hardware pipeline processor, etc.), iii) or a combination of i) and ii), in some embodiments.

The packet processor 108 is implemented using i) one or more processors executing machine readable instructions stored in one or more memories, ii) hardware circuitry (e.g., one or more hardware state machines), iii) or a combination of i) and ii), in some embodiments. In an embodiment, the packet processor 108 comprises a hardware pipeline processor, and the forwarding engine 172 and the trailer processor 176 are pipeline elements hardware pipeline processor.

The transmit processor 192 is implemented using i) one or more processors executing machine readable instructions stored in one or more memories, ii) hardware circuitry (e.g., one or more hardware state machines), iii) or a combination of i) and ii), in some embodiments.

Figure 2:
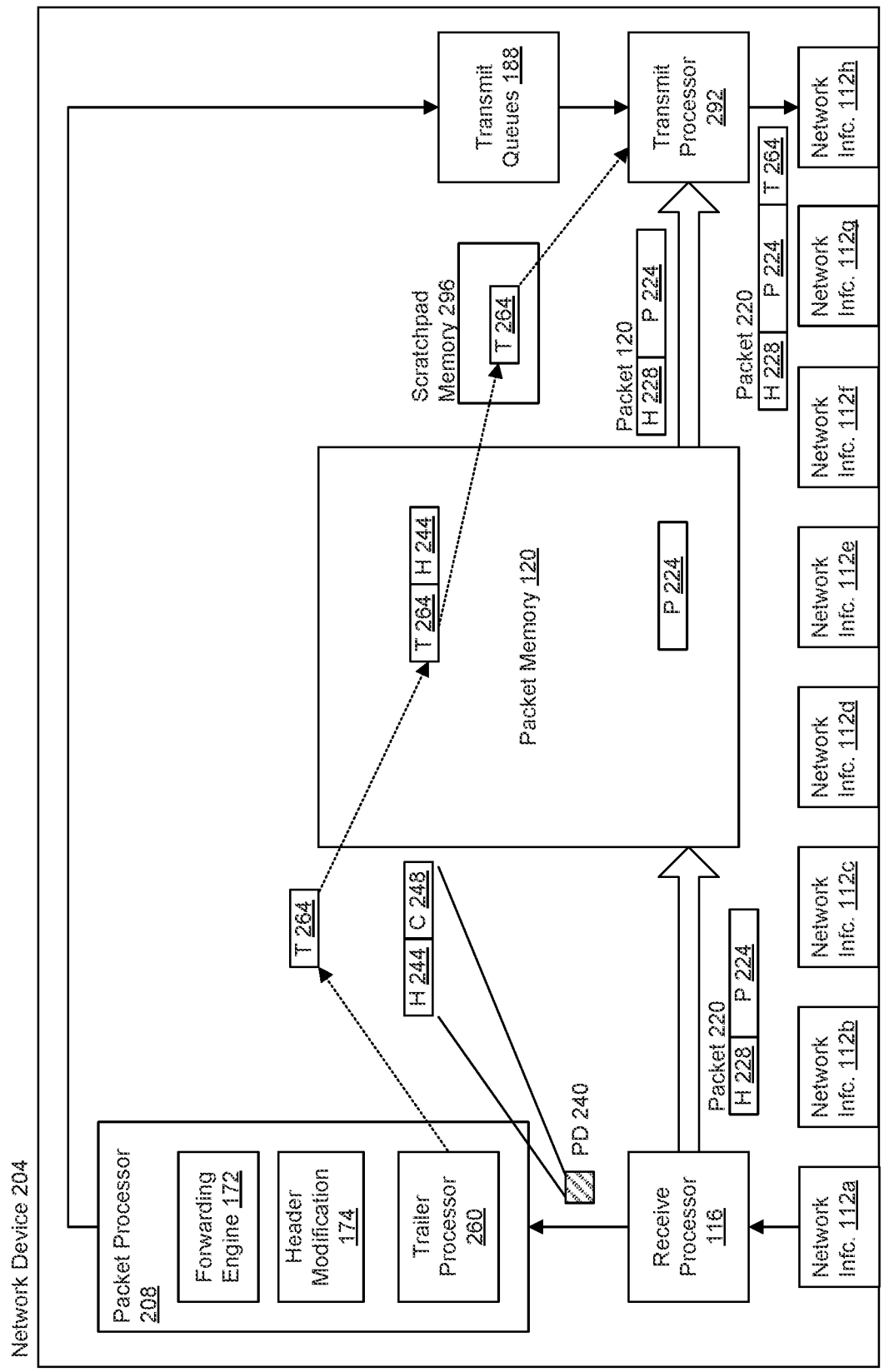
FIG. 2 is a simplified block diagram of an example network device that is configured to add trailers to packets, according to another embodiment.

FIG. 2 is a block diagram of another example network device 204 that includes a packet processor 208 that is configured to selectively add trailers to packets, according to an embodiment. For the PRP, adding a PRP trailer may be useful, for example, if the network device 204 is connected to a source device that is not capable of adding PRP trailers but for which it is desired to use PRP to achieve redundant communications. The network device 204 includes some of the same components as the network device 104 of FIG. 1, and like-numbered elements are not discussed again in detail for purposes of brevity.

The receive processor 116 is configured to store packet data (e.g., at least payloads) corresponding to received packets in the packet memory 120. In FIG. 2, the receive processor 116 is illustrated storing at least a portion of a payload 224 of a packet 220 in the packet memory 120, the packet 220 not having a trailer when received by the network device 204. In some embodiments, the receive processor 116 stores, for each of multiple packets, the entire packet 220 in the packet memory 120. The receive processor 116 stores, for each of multiple packets, the payload 224 and at least a portion of the header 228 in the packet memory 120, according to another embodiment. A remaining portion of the header 228 is later stored in the packet memory 120 by the network device 204, according to an embodiment.

The receive processor 116 generates, for each of multiple packets, a packet descriptor 240 associated with the packet 220, according to an embodiment. Each packet descriptor 240 includes information regarding the corresponding packet, such as header information 244 from the header 228 of the packet 220, and optionally control information 248 associated with the packet 220, such as location information regarding a location of the corresponding packet in the packet memory 120, according to an embodiment.

In an embodiment, the receive processor 116 is configured to extract the header information 244 from the packet 220 and store the extracted header information 244 in the packet descriptor 240.

In some embodiments, the receive processor 116 is configured to extract a fixed length of packet data 244 from a beginning portion of the packet 220 and store the extracted information 244 in the packet descriptor 240. For example, the receive processor 116 is configured to extract a first 128 bytes (or another suitable length) of packet data 244 from the beginning portion of the packet 220 and store the extracted information 244 in the packet descriptor 240, according to an illustrative embodiment.

The receive processor 116 provides the packet descriptors 240 to the packet processor 208, which is configured to process packets (e.g., by analyzing packet descriptors corresponding to the packets), in an embodiment. In other embodiments, the receive processor 116 (or the packet processor 208) stores packet descriptors 240 in a packet descriptor memory (not shown) separate from the packet memory 120, and the packet processor 208 processes the packet descriptors stored in the packet descriptor memory. In such embodiments, a smaller packet descriptor includes an indicator of a location of the packet descriptor 240 in the packet descriptor memory, and the smaller packet descriptor is passed between components of the packet processor 208, and the indicator (within the smaller packet descriptor) of the location of the packet descriptor 240 in the packet descriptor memory is used by components of the packet processor 208 to access the packet descriptor 240. In some embodiments, the smaller packet descriptor optionally includes control information associated with the packet 220, such as location information regarding a location of the corresponding packet in the packet memory 120.

The packet processor 208 also includes a trailer processor 260 that is configured to analyze at least the header information 244 to determine whether a trailer 264 is to be added to the packet 220. As merely an illustrative example, the trailer processor 260 maintains a database (not shown) that indicates one or more source devices (or optionally source device, destination device pairs) for which trailers are to be added to packets that the network device 204 receives from the one or more source devices (and optionally are intended for the one or more destination devices in the source device, destination device pairs). In some such embodiments, the trailer processor 260 also maintains, in the database, path identifiers corresponding to respective network paths from source devices to destination devices used for packets with trailers; and last-used sequence numbers for packets with trailers from source devices to destination devices. In an embodiment, the trailer processor 260 uses header information (e.g., a source address and/or a destination address) to retrieve from the database content information that is to be included in the trailer 264, such as a sequence number and a path identifier.

For example, the trailer processor 260 queries the database with header information (e.g., a source address and a destination address) to determine whether a trailer 264 is to be added to the packet 220, and if the trailer 264 is to be added, to determine contents of the trailer (e.g., a sequence number, a path identifier, etc.).

In response to the trailer processor 260 determining that the trailer 264 is to be added to the packet 220, the trailer processor 260 generates the trailer 264. Additionally, the trailer processor 260 stores the trailer 264 in the descriptor 240, according to an embodiment.

In another embodiment, the trailer processor 260 stores the trailer 264 in the packet memory 120 at a location proximate to a location of a beginning of the header 228 of the packet 220, as opposed to storing the trailer 264 proximate to a location of an end of the packet 220 in the packet memory 120. In an embodiment, the trailer processor 260 appends the trailer 264 to a beginning of the header 228 in the packet memory 120. Because existing packet processors typically have access to packet headers in a packet memory (e.g., for modifying existing headers, appending tunnelling headers to existing headers, etc.), configuring the packet processor 260 to store the trailer 264 in the packet memory 120 at a location proximate to the location of the beginning of the header 228 can be achieved without requiring large-scale changes to packet processor architecture.

Also in response to the trailer processor 260 determining that the trailer 264 is to be added to the packet 220, the trailer processor 260 stores an indication in the packet descriptor 240 (or the smaller packet descriptor) that the trailer 264 is to be added to the packet 220. As will be discussed below, another processing unit in the network device 204 adds, in response to the indication in the packet descriptor, the trailer 264 proximate to an end the packet 220 so that the packet 220 is transmitted from the network device 204 with the trailer 264 proximate to the end of the packet 220.

After the packet descriptor 240 has been processed by the header modification engine 174 and the trailer processor 260, the packet processor 208 stores the header information 244 and the trailer information 264 in the packet memory 120 (or another memory (not shown) separate from the packet memory 120, according to some embodiments. In such embodiments, the header information 244 and the trailer information 264 are stored together in the packet memory 120 (or the other memory (not shown)), i.e., the trailer information 264 is stored at a location that is proximate to a location of the header information 244. In some embodiments, the header information 244 and the trailer information 264 are stored together in the packet memory 120 at a different location than the location at which a remaining portion of the packet 220 (e.g., at least the payload 224) is stored.

In some embodiments, the packet processor 208 modifies the packet descriptor to 240 to include one or more indications of the locations in the packet memory 120 (or the other memory (not shown)) at which the header information 244 and the trailer information 264 are stored. In an embodiment in which the trailer information 264 has a fixed length (e.g., 6 bytes or another suitable length) and the trailer information 264 is stored in the packet memory 120 (or the other memory (not shown)) before and next to the header information 244, the location of the header information 244 can be determined using the location of the trailer information 264 and the fixed length of the trailer information 264. In an embodiment in which the header information 244 has a fixed length (e.g., 128 bytes or another suitable length) and the trailer information 264 is stored in the packet memory 120 (or the other memory (not shown)) after and next to the header information 244, the location of the trailer information 264 can be determined using the location of the header information 244 and the fixed length of the header information 244.

In some embodiments in which the packet processor 208 stores the header information 244 and the trailer information 264 in the packet memory 120 (or the other memory (not shown)) after the packet descriptor 240 has been processed by the header modification engine 174 and the trailer processor 260, the packet processor 208 shortens the packet descriptor 240 by removing the header information 244 and the trailer information 260, or creates a new packet descriptor 240 that omits the header information 244 and the trailer information 264.

The packet processor 208 stores the packet descriptors 240 (or corresponding smaller packet descriptors) into appropriate transmit queues 188 corresponding to appropriate target network interfaces 112.

When a packet descriptor reaches the head of a transmit queue 188, the packet descriptor 240 is provided to a transmit processor 292 that corresponds to the target network interface 112 of the packet corresponding to the packet descriptor. Although only one transmit processor 292 is shown in FIG. 2, and the one transmit processor 292 is shown as being coupled to only one network interface 112, the network device 204 includes multiple transmit processors 292 and each of the multiple transmit processors 292 is coupled to a respective set of one or network interfaces 112, in some embodiments. The multiple transmit processors 292 may be considered collectively as a single transmit processor.

In an embodiment, the transmit processor 292 includes DMA circuitry configured to retrieve packet data in the packet memory 120 via the one or more read/write interfaces of the packet memory 120. In an embodiment in which the header information 244 and the trailer information 264 are stored in the other memory (not shown), the transmit processor 292 includes DMA circuitry configured to retrieve packet data from the other memory via the one or more read/write interfaces of the other memory.

In an embodiment, if the packet descriptor 240 includes an indication that the trailer 264 is to be added to the packet 220, the transmit processor 292, in response to the indication, transfers the trailer 264 corresponding to the packet descriptor from the packet memory 120 (or the other memory (not shown)) to a memory 296 (referred to herein as a "scratchpad" memory) associated with the transmit processor 292. In an embodiment, the packet descriptor 240 includes location information indicating a location of the trailer 264 in the packet memory 120 (or the other memory (not shown)), and the transmit processor 292 uses the location information to retrieve the trailer 264 from the packet memory 120 (or the other memory (not shown)). Additionally, the transmit processor 292 retrieves packet data corresponding to the packet descriptor 240 from the packet memory 120 via the one or more read/write interfaces of the packet memory 120. In an embodiment, the transmit processor 292 uses location information in the packet descriptor 240 to retrieve packet data (e.g., the header information 244 and the payload 224) corresponding to the packet descriptor from the packet memory 120.

The transmit processor 292 then provides the header 244 and the payload 224 to the network interface 112 for transmission. In connection with the transmit processor 292 providing an end of the payload 224 to the network interface 112, the transmit processor 292 retrieves the trailer 264 from the scratchpad memory 296 and provides the trailer 264 to the network interface 112 so that the network interface 112 transmits the trailer 264 after the end of the payload 224.

In another embodiment, the network device 204 omits the scratchpad memory 296. In such embodiments, the transmit processor 292, in connection with providing an end of the payload 224 to the network interface 112, retrieves the trailer 264 from the packet memory 120 (or the other memory (not shown)) and provides the trailer 264 to the network interface 112 so that the network interface 112 transmits the trailer 264 after the end of the payload 224.

The packet processor 208 is implemented using i) one or more processors executing machine readable instructions stored in one or more memories, ii) hardware circuitry (e.g., one or more hardware state machines), iii) or a combination of i) and ii), in some embodiments. In an embodiment, the packet processor 208 comprises a hardware pipeline processor, and the forwarding engine 172 and the trailer processor 260 are pipeline elements hardware pipeline processor.

In an embodiment, the network device 204 further includes one or more CPUs (not shown).

The transmit processor 292 is implemented using i) one or more processors executing machine readable instructions stored in one or more memories, ii) hardware circuitry (e.g., one or more hardware state machines), iii) or a combination of i) and ii), in some embodiments.

In some embodiments, a network processor combines the functionality of the network processor 104 (FIG. 1) and the functionality of the network processor 204 (FIG. 2). In such embodiments, the network processor includes functionality and structure described with reference to FIG. 1 and functionality and structure described with reference to FIG. 2.

Figure 3:
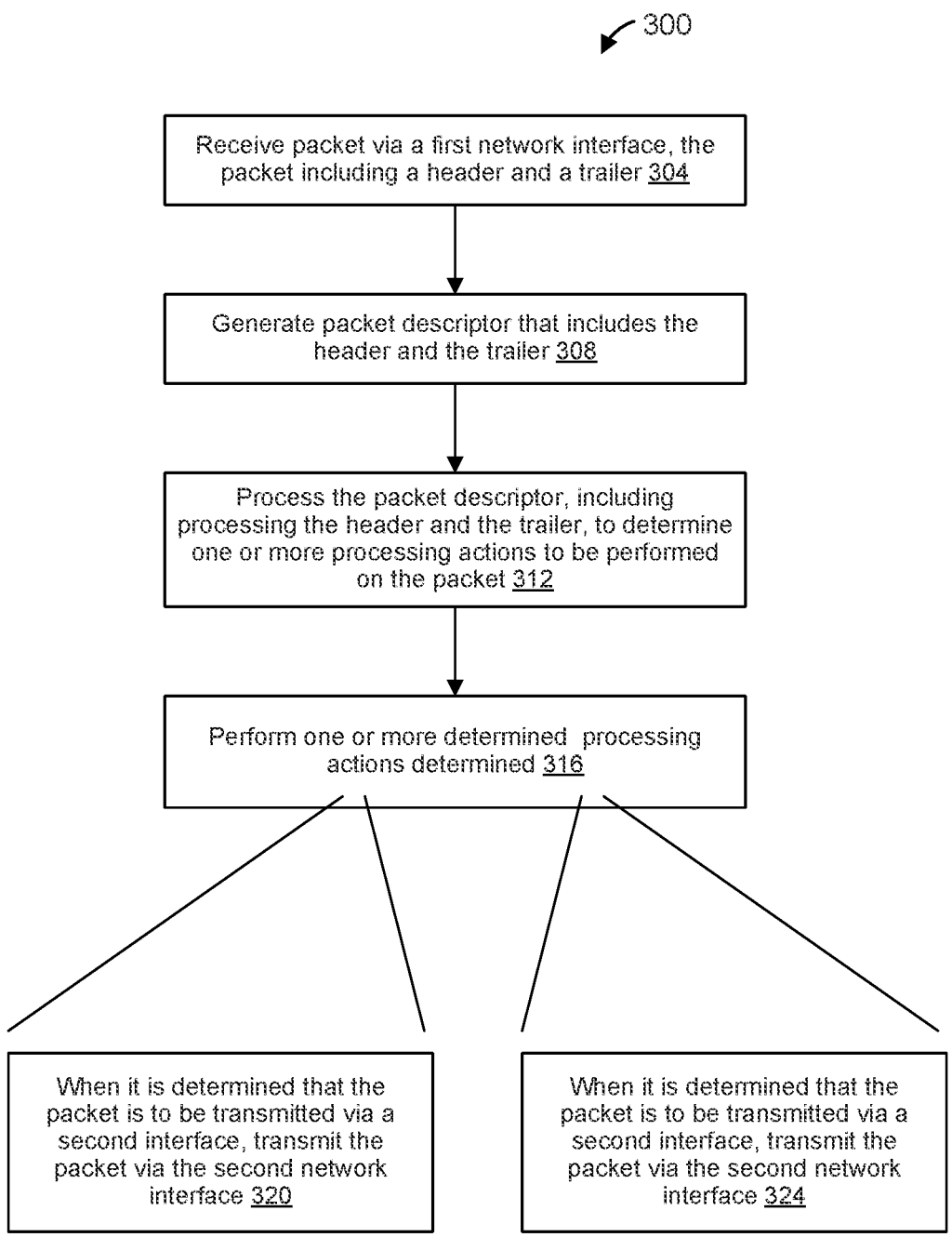
FIG. 3 is a flow diagram of an example method for processing packets with trailers, according to an embodiment.

FIG. 3 is a flow diagram of an example method 300 for processing packets having trailers in a network device, according to an embodiment. The method 300 is implemented in the example network device 104 of FIG. 1, according to an embodiment, and the method 300 is described with reference to FIG. 1 for ease of explanation. In other embodiments, the method 300 is implemented in a suitable network device different than the example network device 104.

At block 304, a packet is received by the network device via a first network interface, the packet having a header and a trailer. In an embodiment, the header is adjacent to a beginning portion of a payload of the packet, and the trailer is adjacent to an end portion of the payload.

At block 308, a packet descriptor is generated for the packet, the packet descriptor being generated to include i) header information extracted from the header of the packet, and ii) trailer information extracted from the trailer of the packet. For example, the receive processor 116 extracts header information 144 from the header 132 and extracts trailer information 148 from the trailer 136, and stores the header information 144 and the trailer information 148 in the packet descriptor, according to an embodiment.

In some embodiments, the method 300 further comprises storing at least some packet data from the packet received at block 304 in a packet memory of the network device, and storing in the packet descriptor an indication of a location of the packet data in the packet memory.

At block 312, a packet processor of the network device processes the packet descriptor, including processing header information and trailer information in the packet descriptor, to determine one or more actions to be performed on the packet. For example, the trailer processor 176 processes the packet descriptor 140, including processing header information 144 and trailer information 148, to determine one or more actions to be performed on the packet 124, according to an embodiment.

In an embodiment, block 312 comprises processing header information and trailer information in the packet descriptor to determine whether the packet is to be dropped. In an embodiment, block 312 comprises processing header information and trailer information in the packet descriptor to determine whether the trailer of the packet is to be removed.

At block 316, the network device performs at least one of the processing action(s) determined at block 312. For example, at block 320, when the network device determines at block 312 that the packet is to be dropped, the network device drops the packet. Dropping the packet includes preventing the network device from ever transmitting the packet to a destination indicated in the header of the packet, according to an embodiment.

On the other hand, at block 324, when the packet processor determines that the packet is to be transmitted via a second network interface, the network device transmits the packet via the second network interface. For example, the transmit processor 192 retrieves at least a portion of the packet 124 from the packet memory 120 and provides the at least the portion of the packet 124 to corresponding the network interface 112 for transmission of the least the portion of the packet 124.

In an embodiment, when the network device determines at block 312 that the trailer of the packet is to be removed, block 324 includes transmitting the packet without the trailer so that the packet, when transmitted, does not include the trailer.

Figure 4:
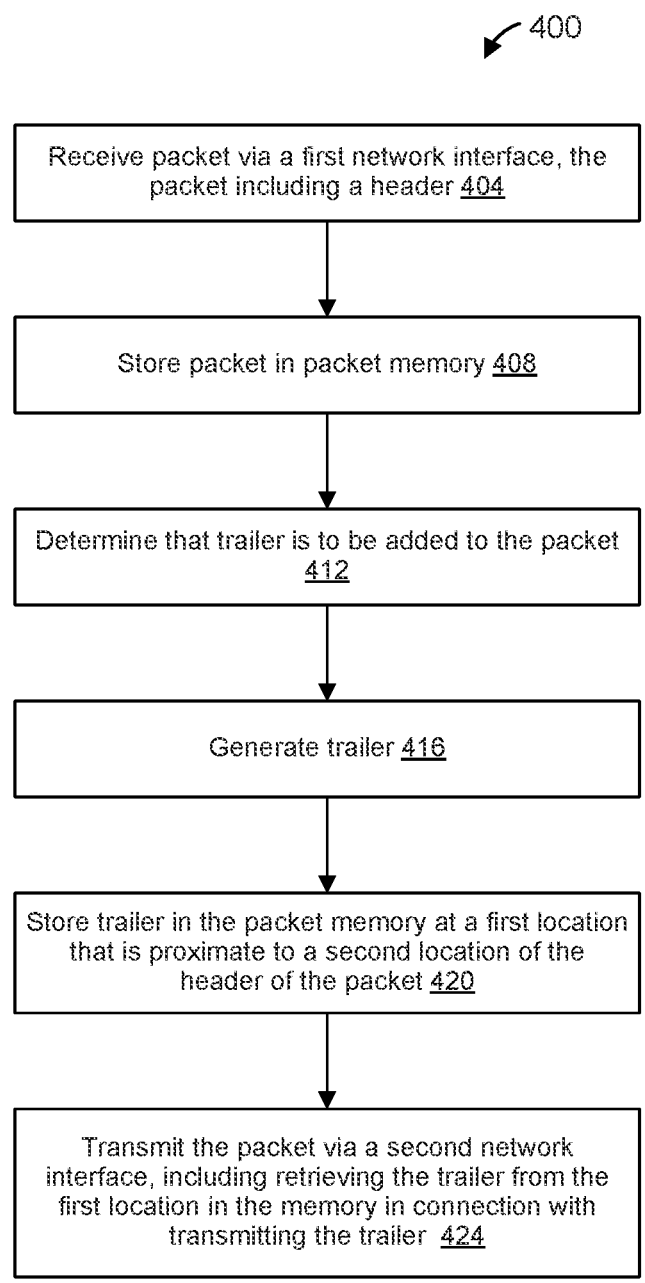
FIG. 4 is a flow diagram of an example method for adding trailers to packets, according to another embodiment.

FIG. 4 is a flow diagram of an example method 400 for adding trailers to packets in a network device, according to an embodiment. The method 400 is implemented in the example network device 204 of FIG. 2, according to an embodiment, and the method 400 is described with reference to FIG. 2 for ease of explanation. In other embodiments, the method 400 is implemented in a suitable network device different than the example network device 204.

At block 404, a packet is received by the network device via a first network interface, the packet having a header. In an embodiment, the header is adjacent to a beginning portion of a payload of the packet.

At block 408, the network device stores the packet in a packet memory of the network device. For example, the receive processor 116 stores the packet 220 in the packet memory 120, according to an embodiment. In an embodiment, the header is stored adjacent to a beginning portion of a payload of the packet in the memory.

At block 412, the network device determines that a trailer is to be added to the packet. For example, the trailer processor 260 determines that a trailer is to be added to the packet 220. In an embodiment, the method 400 comprises generating a packet descriptor, and block 412 includes processing the packet descriptor to determine that a trailer is to be added to the packet. For example, the receive processor 116 extracts header information 244 from the header 228 and stores the header information 244 in the packet descriptor 240, according to an embodiment. In embodiments that include generating a packet descriptor, the packet descriptor is generated to include header information extracted from the header of the packet, and the network device processes at least the header information to determine that a trailer is to be added to the packet.

At block 416, the trailer is generated. For example, the trailer processor 260 generates the trailer 264 when the trailer processor 260 determines that a trailer is to be added to the packet 220, according to an embodiment.

At block 420, the network device stores the trailer in the packet memory at a first location that is proximate to a second location at which the header of the packet is stored. For example, the trailer processor 260 stores the trailer 264 in the packet memory 120 at a first location that is proximate to a second location at which the header 228 of the packet is stored, according to an embodiment.

At block 424, the network device transmits the packet via the second network interface. Transmitting the packet at block 424 includes retrieving the trailer from the packet memory 120 at the first location in connection with transmitting the trailer. For example, the transmit processor 292 retrieves the header 228 and the payload 224 from the packet memory 120 and provides the header 228 and the payload 224 to a corresponding network interface 112 for transmission of the header 228 and the payload 224. In connection with transmitting the trailer 264, the transmit processor 292 retrieves the trailer 264 from the packet memory 120 at the first location.

In an embodiment, block 424 includes retrieving the trailer from the packet memory 120 at the first location and storing the trailer in another memory (e.g., the scratchpad memory 296) different than the packet memory 120; and then retrieving the trailer from the other memory in connection with transmitting the trailer.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a receive processor configured to couple to a plurality of network interfaces, the receive processor further configured to generate respective packet descriptors that include
i) respective header information extracted from headers of packets received via the plurality of network interfaces, the packets also including trailers, and
ii) respective trailer information extracted from the trailers of the packets;
a packet processor configured to process the header information and the trailer information in the packet descriptors to determine actions to be performed on the packets, including determining network interfaces, among the plurality of network interfaces, via which at least some packets are to be transmitted by the network device; and
a transmit processor configured to couple to the plurality of network interfaces, the transmit processor further configured to transmit the at least some packets via the plurality of network interfaces in accordance with the determining of network interfaces by the packet processor.

2. The network device of claim 1, wherein the packet processor is further configured to, when processing the header information and the trailer information in the packet descriptors to determine actions to be performed on the packets:
process at least trailer information included in one packet descriptor associated with one of the packets to determine if the one packet is to be dropped by the network device; and
in response to the packet processor determining that the one packet is to be dropped, control the network device to drop the one packet.

3. The network device of claim 2, wherein the packet processor is configured to:
in response to the packet processor determining that the one packet is to be dropped by the network device, include in the one packet descriptor corresponding to the one packet an indication that the one packet is to be dropped; and
in response to the packet processor determining that the one packet descriptor includes the indication that the one packet is to be dropped, control the network device to drop the one packet.

4. The network device of claim 1, wherein:
the packet processor is configured to process header information included in one packet descriptor associated with one of the packets to determine if a trailer of the one packet is to be removed from the one packet so that the one packet, after having been transmitted by the network device, does not include the trailer; and
the transmit processor is configured to, in response to the packet processor determining that the trailer of the one packet is to be removed from the one packet, provide packet data to a network interface for transmission from the network device without providing the trailer so that the one packet does not include the trailer when transmitted by the network interface.

5. The network device of claim 4, wherein:
the packet processor is configured to, in response to determining that the trailer of the one packet is to be removed from the one packet, include in the one packet descriptor corresponding to the one packet an indication that the trailer of the one packet is to be removed from the one packet; and
the transmit processor is configured to, in response to determining that the one packet descriptor corresponding to the one packet includes the indication that the trailer of the one packet is to be removed from the one packet, provide the packet data to the network interface for transmission from the network device without providing the trailer.

6. A method for processing packets with trailers, comprising:
receiving a packet via a first network interface of a network device, the packet including a header and a trailer, the first network interface among a plurality of network interfaces of the network device;

generating, at the network device, a packet descriptor that includes i) header information extracted from the header of the packet, and ii) trailer information extracted from the trailer of the packet;

processing, at a packet processor of the network device, the packet descriptor, including processing the header information and the trailer information in the packet descriptor, to determine one or more processing actions to be performed on the packet, including determining one or more second network interfaces, among the plurality of network interfaces, via which at least some packets are to be transmitted by the network device; and in response to the packet processor determining, based on processing the packet descriptor, that the packet is to be transmitted via the one or more second network interfaces of the network device, transmitting the packet via the one or more second network interfaces.

7. The method of processing packets of claim 6, wherein:

processing the packet descriptor comprises processing, at the packet processor, at least trailer information in the packet descriptor to determine if the packet is to be dropped by the network device; and the method further comprises: in response to the packet processor determining that the packet is to be dropped, dropping the packet.

8. The method of processing packets of claim 7, wherein:

the method further comprises: in response to determining that the one packet is to be dropped by the network device, including, by the packet processor, an indication that packet is to be dropped in the packet descriptor; and dropping the packet is in response to the packet processor determining that the packet descriptor includes the indication that that packet is to be dropped.

9. The method of processing packets of claim 6, wherein:

processing the packet descriptor comprises processing, at the packet processor, header information included in the packet descriptor to determine if the trailer of the packet is to be removed from the packet so that the packet, after having been transmitted by the network device, does not include the trailer; and the method further comprises: in response to the packet processor determining that the trailer of the packet is to be removed from the packet, providing packet data to the second network interface for transmission from the network device without providing the trailer so that the packet does not include the trailer when transmitted by the second network interface.

10. The method of processing packets of claim 9, wherein:

the method further comprises: in response to determining that the trailer of the packet is to be removed from the packet, including in the packet descriptor, by the packet processor, an indication that the trailer of the packet is to be removed from the packet; and providing packet data to the second network interface for transmission from the network device without providing the trailer is in response to determining that the packet descriptor includes the indication that the trailer of the packet is to be removed from the packet.

11. A network device, comprising:

a packet memory configured to store packets received via a plurality of network interfaces;

a receive processor configured to couple to the plurality of network interfaces, the receive processor further configured to i) generate respective packet descriptors that include respective header information extracted from headers of packets received via the plurality of network interfaces, and ii) store the packets in the packet memory;

a packet processor configured to process the packet descriptors to determine actions to be performed on the packets, including, in response to determining that respective trailers should be added to a set of packets received via the plurality of network interfaces, i) generate the trailers, and ii) store each trailer that is to be added at a respective first location in the packet memory that is proximate to a respective second location in the packet memory of the respective header of the respective packet; and a transmit processor configured to couple to the plurality of network interfaces, the transmit processor further configured to transmit at least some packets via the plurality of network interfaces, including: in connection with transmitting each packet for which a trailer is to be added, retrieve the respective trailer from the respective first location in the packet memory in connection with transmitting the respective trailer.

12. The network device of claim 11, further comprising:

a memory separate from the packet memory;

wherein the transmit processor is further configured to, in connection with transmitting each packet for which a trailer is to be added:

before the respective trailer is to be transmitted, retrieve the trailer from the packet memory and store the respective trailer in the memory separate from the packet memory, and when the trailer is to be transmitted, retrieve the trailer from the memory separate from the packet memory.

13. The network device of claim 11, wherein the transmit processor is further configured to, in connection with transmitting each packet for which a trailer is to be added:

when the trailer is to be transmitted and after the transmit processor has retrieved the header from the packet memory, retrieve the trailer from the packet memory.

14. The network device of claim 11, wherein:

the packet processor is further configured to: in response to the packet processor determining that a trailer is to be added to a first packet, include in a first packet descriptor corresponding to the first packet an indication that a trailer is to be added to the first packet; and the transmit processor is further configured to: in response to the transmit processor determining that the first packet descriptor includes the indication that the trailer is to be added to the first packet, retrieve the trailer from the respective first location in the packet memory in connection with transmitting the respective trailer.

15. A method for adding trailers to packets, comprising:

receiving a packet via a first network interface of a network device, the packet including a header;

storing the packet in a packet memory of the network device;

determining, at the network device, that a trailer is to be added to the packet;

in response to determining that the trailer is to be added to the packet, generating, at the network device, the trailer;

storing the trailer in the packet memory at a first location that is proximate to a second location of the header of the packet; and transmitting, by the network device, the packet via a second network interface of the network device, including retrieving the trailer from the first location in the packet memory in connection with transmitting the trailer of the packet.

16. The method of adding trailers to packets of claim 15, further comprising, in connection with transmitting the packet:
- before the trailer is to be transmitted, retrieving the trailer from the packet memory and storing the trailer in a memory separate from the packet memory; and
- when the trailer is to be transmitted, retrieving the trailer from the memory separate from the packet memory.

17. The method of adding trailers to packets of claim 15, further comprising, in connection with transmitting the packet:
- when the trailer is to be transmitted and after retrieving the header from the packet memory, retrieving the trailer from the packet memory.

18. The method of adding trailers to packets of claim 15, wherein:
- in response to determining that the trailer is to be added to the packet, including, by the network device, in a packet descriptor corresponding to the packet an indication that a trailer is to be added to the packet; and
- retrieving the trailer from the first location in the packet memory is in response to the network device determining that the packet descriptor includes the indication that the trailer is to be added to the packet.

\* \* \* \* \*